United States Patent
Yamanouchi et al.

(10) Patent No.: US 11,351,865 B2
(45) Date of Patent: Jun. 7, 2022

(54) VEHICLE START-UP MECHANISM

(71) Applicant: Toyota Jidosha Kabushiki Kaisha, Toyota (JP)

(72) Inventors: Yuchi Yamanouchi, Toyota (JP); Masaki Shitara, Nagakute (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 16/913,147

(22) Filed: Jun. 26, 2020

(65) Prior Publication Data

US 2020/0406756 A1  Dec. 31, 2020

(30) Foreign Application Priority Data

Jun. 28, 2019 (JP) .............................. JP2019-121478

(51) Int. Cl.
| | |
|---|---|
| *B60K 37/06* | (2006.01) |
| *B60K 28/00* | (2006.01) |
| *B60R 25/04* | (2013.01) |
| *B60R 25/00* | (2013.01) |

(52) U.S. Cl.
CPC .............. *B60K 37/06* (2013.01); *B60K 28/00* (2013.01); *B60R 25/003* (2013.01); *B60R 25/04* (2013.01)

(58) Field of Classification Search
None
See application file for complete search history.

(56) References Cited

U.S. PATENT DOCUMENTS

| | | | |
|---|---|---|---|
| 5,837,933 A | 11/1998 | Fligelman | |
| 2017/0057520 A1 | 3/2017 | Letwin et al. | |
| 2017/0315552 A1 | 11/2017 | Matsuyama et al. | |
| 2018/0292829 A1* | 10/2018 | Li | B60W 50/10 |
| 2019/0061688 A1 | 2/2019 | Watanabe | |
| 2019/0100208 A1* | 4/2019 | Plianos | B60W 20/10 |
| 2020/0361481 A1 | 11/2020 | Whitfield, Jr. et al. | |

FOREIGN PATENT DOCUMENTS

| | | |
|---|---|---|
| CN | 109421662 A | 3/2019 |
| JP | 2001-249719 A | 9/2001 |
| JP | 2004-225628 A | 8/2004 |
| JP | 2010-222108 A | 10/2010 |
| JP | 2013-135549 A | 7/2013 |
| JP | 2017-200790 A | 11/2017 |
| WO | 2015037442 A1 | 3/2015 |

OTHER PUBLICATIONS

Extended European Search Report dated Dec. 8, 2020 in EP20182381.2.

* cited by examiner

*Primary Examiner* — Colby M Hansen
(74) *Attorney, Agent, or Firm* — Dinsmore & Shohl LLP

(57) ABSTRACT

A vehicle start-up mechanism is provided in a vehicle configured to travel while occupants are boarded in a vehicle cabin. The vehicle start-up mechanism includes: a first vehicle start-up switch configured to switch the state of the vehicle between the start-up state and the halt state; and a switch box provided on an outer surface of the vehicle and having the first vehicle start-up switch. The vehicle has an autonomous driving function.

20 Claims, 11 Drawing Sheets

FIG. 3
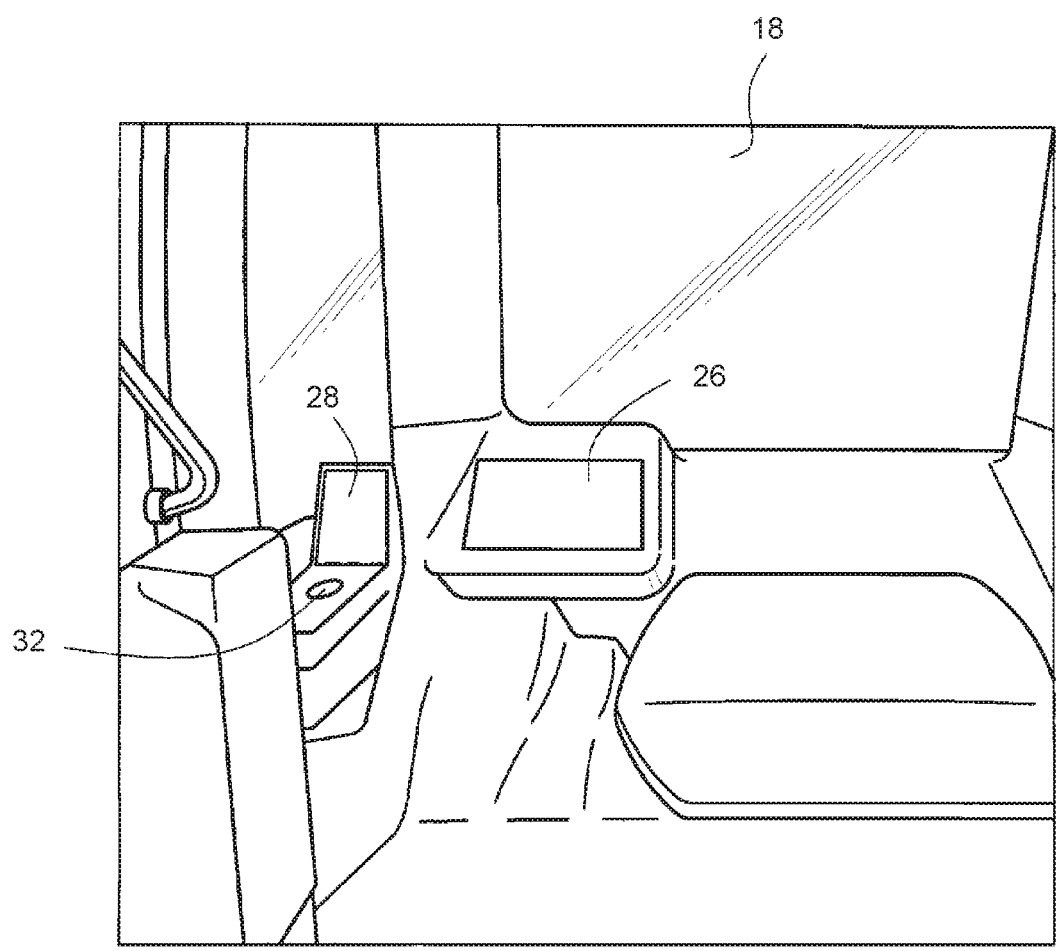
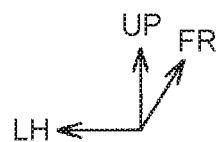

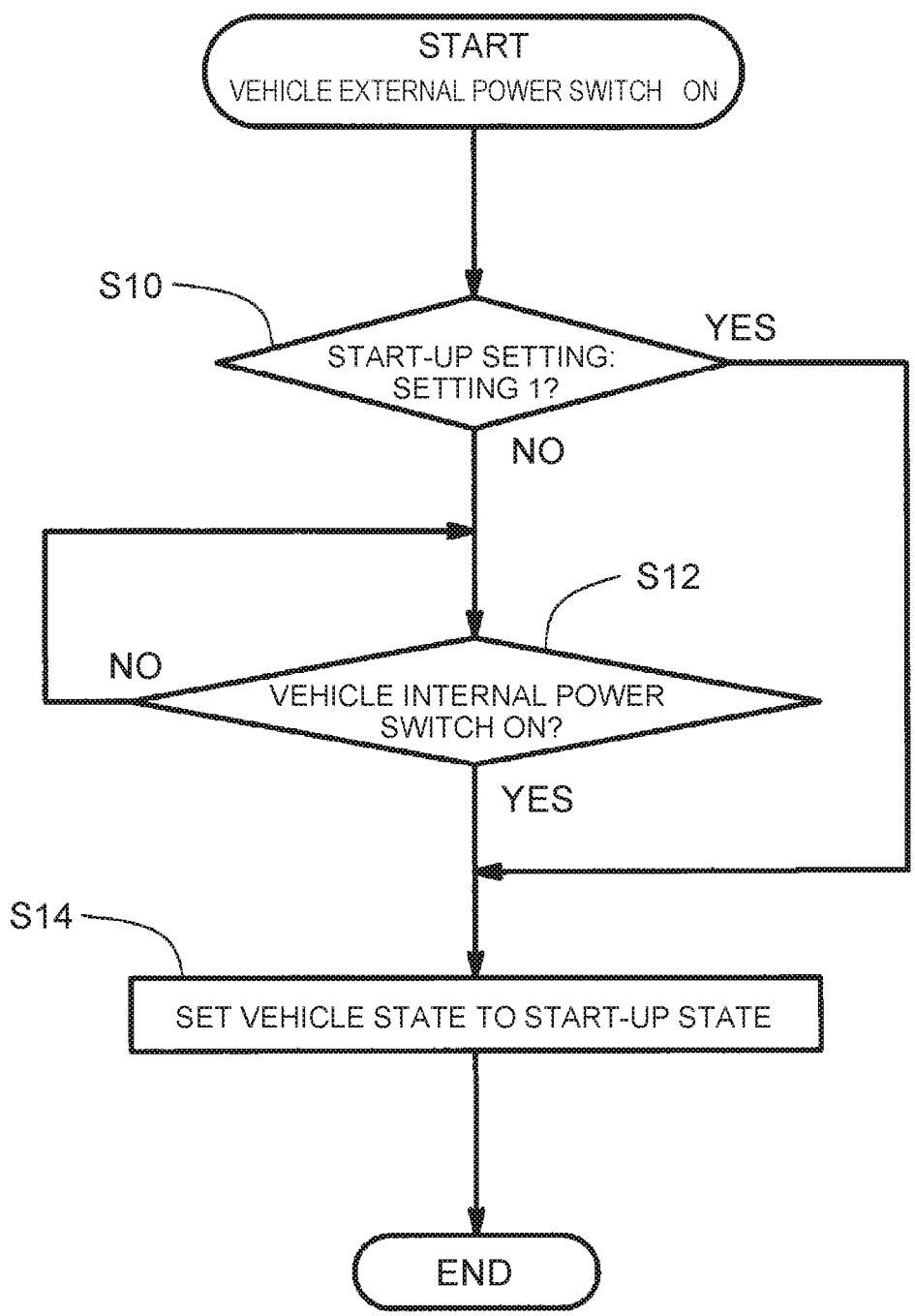

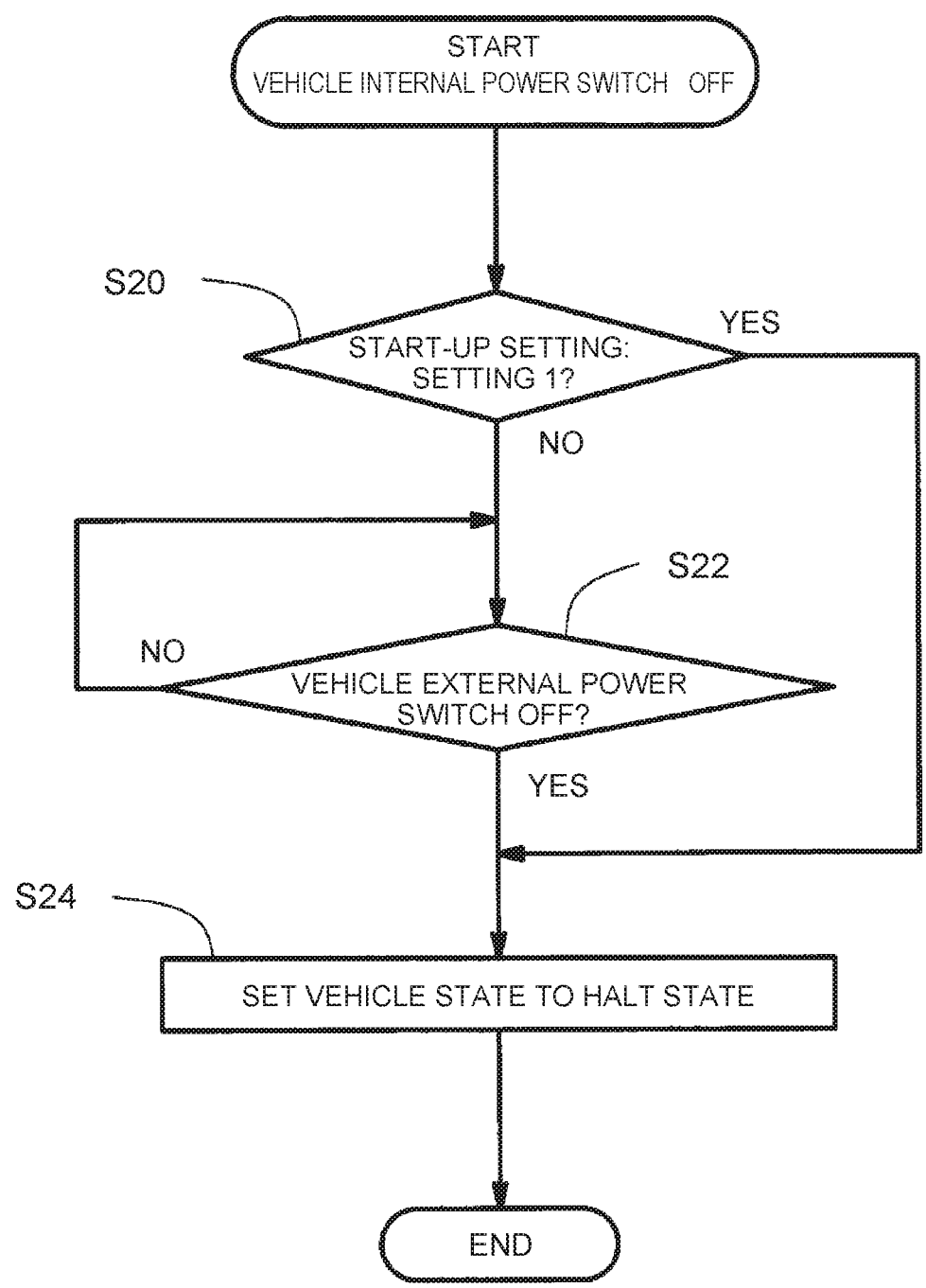

VEHICLE START-UP MECHANISM

CROSS-REFERENCE TO RELATED APPLICATIONS

This application claims priority to Japanese Patent Application No. 2019-121478 filed on Jun. 28, 2019, which is incorporated herein by reference in its entirety including the specification, drawings and abstract.

BACKGROUND

1. Technical Field

The present specification discloses a vehicle start-up mechanism configured to switch the state of a vehicle between a start-up state and a halt state.

2. Description of Related Art

As a mechanism for switching the state of a vehicle between a start-up state and a halt state, the vehicle is provided with a vehicle start-up switch called as an ignition switch or a power switch. For example, in a vehicle, a vehicle start-up switch is provided near a driver's seat.

For example, when a driving source of the vehicle is an internal combustion engine, the internal combustion engine in a stopped state is started up (initially exploded) by pushing a vehicle start-up switch (ignition switch), so that the vehicle comes into a start-up state.

As described in Japanese Patent Application Publication No. 2013-135549 and others, in a so-called hybrid vehicle or an electric vehicle in which a rotating electric machine is installed as a driving source of a vehicle, as a vehicle start-up switch (power switch) is pushed, a high-voltage wiring connecting an in-vehicle battery to the rotating electric machine comes into a connection state from a cutoff state.

In addition, Japanese Patent Application Publication No. 2017-200790 discloses an autonomous traveling vehicle that autonomously travels in a security target facility such as a building. This vehicle is provided with an emergency stop button above a chassis of the vehicle.

SUMMARY

In the meantime, an operation state that does not require a driver can be assumed depending on the autonomous driving mode of a vehicle. For example, the standard by the American Society of Automotive Engineers (SAE) defines fully autonomous driving that does not require a driver as the definition of autonomous driving level 5. For example, at the autonomous driving level 5, in a shared vehicle such as a bus or a freight vehicle, it is assumed that the vehicle travels in condition with absence of a driver.

When the vehicle is started up for fully autonomous driving and when the vehicle is halted after the start-up, an operator in charge enters a vehicle cabin, which the operator in charge does not normally need to enter, from outside the vehicle and operates the vehicle start-up switch, which may make the operation more troublesome.

On the other hand, in the autonomous driving levels 0 to 4, although the autonomous driving is performed in some modes of the vehicle operation, operation by the driver is required in some situations. That is, it is necessary for the driver to get in the vehicle cabin and operate the vehicle.

Therefore, the present disclosure discloses a vehicle start-up mechanism configured to perform a start-up operation and a halting operation of the vehicle in accordance with the level of the autonomous driving in a vehicle having an autonomous driving function.

A first aspect of the present disclosure is a vehicle start-up mechanism. The vehicle start-up mechanism is provided in a vehicle configured to travel while occupants are boarded in a vehicle cabin. The vehicle start-up mechanism includes: a first vehicle start-up switch configured to switch a state of the vehicle between a start-up state and a halt state; and a switch box provided on an outer surface of the vehicle and having the first vehicle start-up switch. The vehicle has an autonomous driving function.

According to the first aspect, an operator in charge who manages the operation of the vehicle can operate the first vehicle start-up switch from outside the vehicle. Therefore, when the level of the autonomous driving is set to level 5 which does not require a driver, the operator in charge can carry out the switching between the start-up and the halt of the vehicle without entering the vehicle cabin.

In the first aspect, the vehicle start-up mechanism may include a second vehicle start-up switch configured to switch the state of the vehicle between the start-up state and the halt state, and a control unit. The control unit may be configured to receive an ON signal and an OFF signal from the first vehicle start-up switch and the second vehicle start-up switch. The control unit may be configured to control start-up and halt of the vehicle based on the ON signal or the OFF signal. The control unit may be configured to set the state of the vehicle to the start-up state from the halt state, the setting being triggered when the second vehicle start-up switch is turned on after the first vehicle start-up switch is turned on.

According to the above configuration, for switching the state of the vehicle between the start-up state and the halt state, by requesting the operation of the second vehicle start-up switch in addition to the operation of the first vehicle start-up switch from the outside of the vehicle, for example, it is possible to perform an appropriate start-up operation of the vehicle in the case in which the autonomous driving level is set to level 0 to level 4, which requires the driver to operate the vehicle.

In the first aspect, the second vehicle start-up switch may be provided in the vehicle cabin of the vehicle.

According to the above configuration, it is possible to start up and halt the vehicle after the driver enters the vehicle.

In the first aspect, the switch box may be provided with a lid member configured to switch the first vehicle start-up switch between a state of being exposed to the outside and a state of being covered from the outside.

According to the above configuration, the first vehicle start-up switch can be prevented from being exposed to rain and snow.

In the first aspect, the switch box may be provided with a lock-unlock unit for the lid member.

According to the above configuration, it is possible to prevent the first vehicle start-up switch from being operated for the purpose of mischief by an unauthorized person other than an authorized person such as an operator in charge.

In the first aspect, the switch box may also function as a charging port for external charging. A charging inlet configured to be connected to an external charging connector may be provided together with the first vehicle start-up switch in the switch box.

According to the above configuration, an external charging mechanism and the vehicle starting mechanism can be put together in a single box.

In the first aspect, the switch box may also function as a fuel supply port unit. A fuel supply port of a fuel inlet pipe into which an external refueling nozzle is inserted may be provided together with the first vehicle start-up switch in the switch box.

According to the above configuration, a fuel supply mechanism and the vehicle starting mechanism can be put together in a single box.

In the first aspect, the switch box may be provided on a rear surface of the vehicle.

According to the above configuration, since the first vehicle start-up switch is disposed on the side opposite to the traveling direction of the vehicle, the safety for the operator of the switch is achieved.

In the first aspect, the switch box may be at a position avoiding an open-close area of an entrance door.

According to the above configuration, the first vehicle start-up switch can be operated without being affected by the open and close of the entrance door.

In the first aspect, the switch box may also function as a charging port for external charging; and a charging inlet configured to be connected to an external charging connector may be provided together with the first vehicle start-up switch in the switch box.

According to the above-described configuration, an operator in charge who manages the operation of the vehicle can operate the first vehicle start-up switch from the outside of the vehicle. Therefore, when the level of the autonomous driving is set to the level 5 that does not require a driver, the operator in charge can perform the switching operation between the start-up and the halt of the vehicle without entering the vehicle cabin. In addition, according to the above configuration, the external charging mechanism and the vehicle starting mechanism can be put together in a single box.

According to the first aspect of the present disclosure, it is possible to perform the start-up operation and the halting operation of the vehicle in accordance with the level of the autonomous driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a perspective view as viewed frontward from the center of a vehicle cabin;

FIG. 10 is a flowchart exemplifying a flow of a start-up control on the vehicle; and FIG. 11 is a flowchart exemplifying a flow of a halt control on the vehicle.

DETAILED DESCRIPTION OF EMBODIMENTS

Hereinafter, with reference to the drawings, the configuration of a vehicle 10 equipped with a vehicle start-up mechanism according to the present embodiment will be described. In FIG. 1 to FIG. 8, the front-rear direction of a vehicle body is indicated by an axis denoted by a symbol FR, the vehicle width direction is indicated by an axis denoted by a symbol LH (left hand), and the vehicle height direction is indicated by an axis denoted by a symbol UP. The front-rear axis FR of the vehicle body has the frontward direction of the vehicle body as its positive direction. The vehicle width axis LH has the left side of the vehicle width direction as its positive direction. The vehicle height axis UP has the upward direction as its positive direction. These three axes are orthogonal to each other.

In the following description, the front side in the front-rear direction of the vehicle body is simply referred to as "front", and the rear side in the front-rear direction of the vehicle body is simply referred to as "rear", unless otherwise specifically mentioned. Further, the upper side in the vehicle height direction is simply referred to as "upper", and the lower side in the vehicle height direction is simply referred to as "lower".

Overall Configuration

Figure 1:
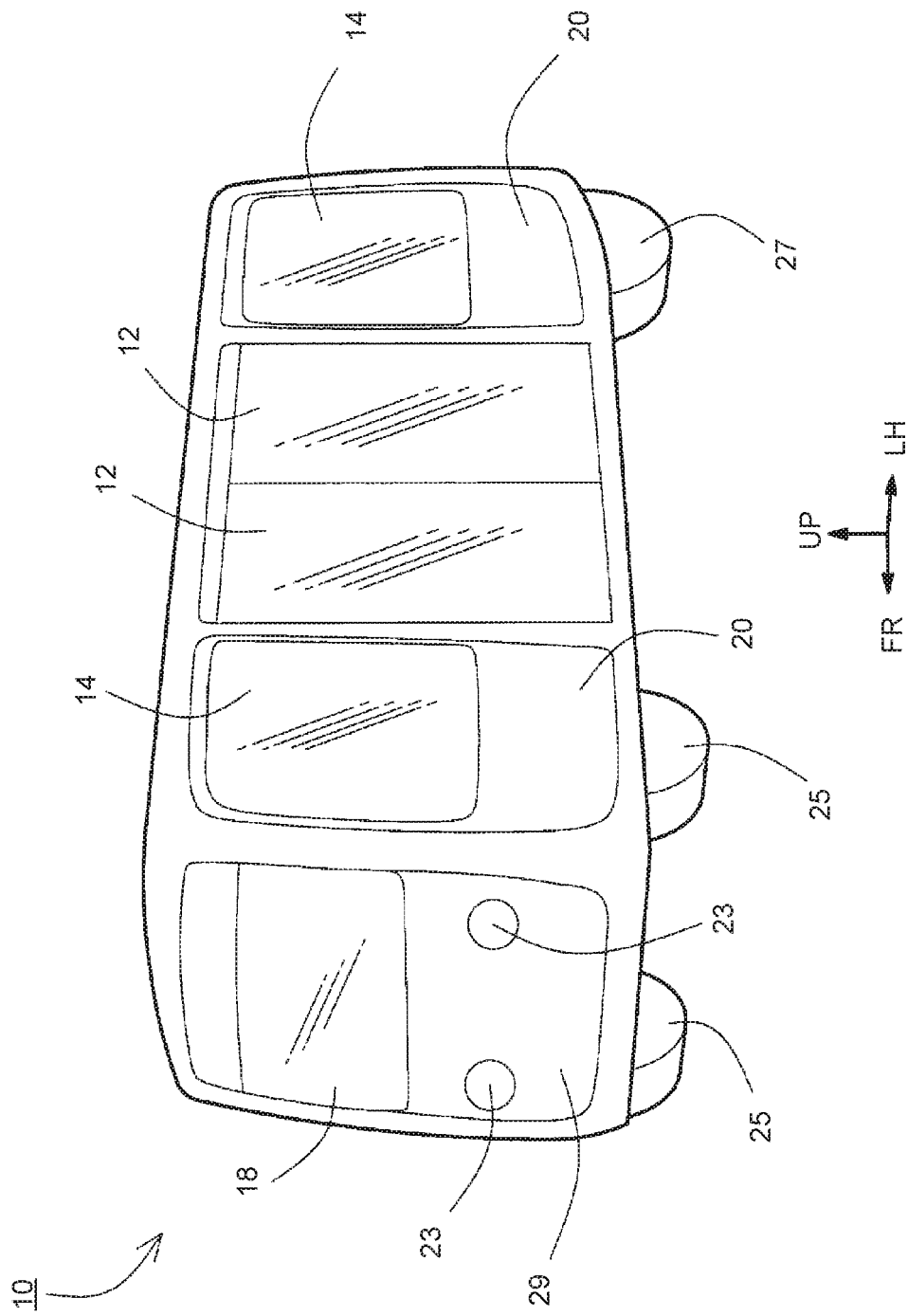
FIG. 1 is a perspective view of an appearance of a vehicle and showing the front side and the left side of the vehicle, as viewed from the outside.
Figure 2:
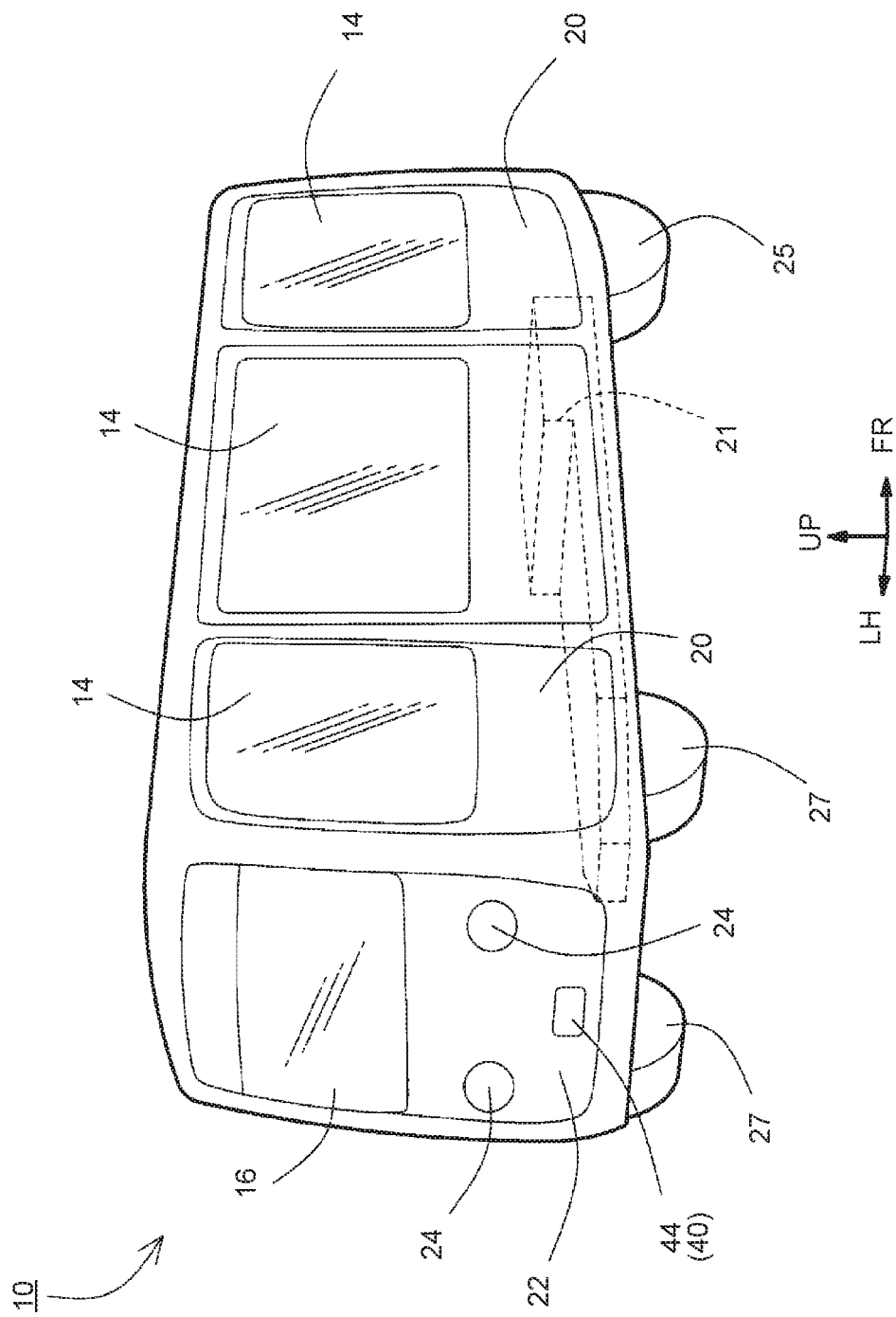
FIG. 2 is a perspective view of the appearance of the vehicle and showing the rear side and the right side of the vehicle, as viewed from the outside.

First, the overall configuration of the vehicle 10 will be briefly described with reference to FIG. 1 to FIG. 3. FIG. 1 and FIG. 2 are perspective views exemplifying the appearance of the vehicle 10. FIG. 1 exemplifies a perspective view showing the front side (front) and the left side of the vehicle 10. FIG. 2 exemplifies a perspective view showing the back side (rear) and the right side of the vehicle 10.

The vehicle 10 has an autonomous driving function. For example, based on the standards of the American Society of Automotive Engineers (SAE), the vehicle 10 can be operated from level 0 (a driver performs all operations) to level 5 (completely autonomous driving). For example, from level 0 to level 3, the vehicle is required to be operated at least partially by a driver. For example, at level 4 (highly autonomous driving), completely autonomous driving is executed in a limited area, but a driver is required outside this limited area. At level 5, autonomous driving requiring no driver (completely autonomous driving) is executed in any situation.

The vehicle 10 is used as a shared bus that travels with occupants boarded in its vehicle cabin, while traveling autonomously along a prescribed route on a specific site, for example. Therefore, the vehicle 10 has to stop and start repetitively at a relatively high frequency. Further, the vehicle 10 has entrance doors 12 that are opened and closed at a relatively high frequency for occupants to get on and off. The vehicle 10 travels at a relatively low speed (for example, 30 km/h or less).

However, the usage of the vehicle 10 disclosed in the present specification can be changed as appropriate. For example, the vehicle 10 may be used as a movable business space. Further, for example, the vehicle 10 may be used as a shop such as a retail shop for displaying and selling various products, and a restaurant where foods are cooked and served. As another mode, the vehicle 10 may be used as an office where office working, meetings with customers, and the like are conducted. Further, the vehicle 10 may be used as a taxi, a bus, or a transportation vehicle for transporting customers and luggage. Moreover, the usage scene of the vehicle 10 is not limited to business scenes. For example, the vehicle 10 may be used as private transportation. Further, the traveling pattern and traveling speed of the vehicle 10 may be changed as appropriate.

The vehicle 10 is an electric vehicle having a drive motor as a prime mover, for example. The vehicle 10 is equipped with a main battery 21 (see FIG. 2) for supplying electric power to this drive motor. The vehicle 10 is not limited to an electric vehicle, and may be another type of vehicle. For example, the vehicle 10 may be an engine vehicle equipped with an engine (internal combustion engine) as a prime mover, or a hybrid vehicle equipped with an engine and a drive motor as prime movers. Further, the vehicle 10 may be a fuel cell vehicle that drives a drive motor with electric power generated by the fuel cell.

The vehicle 10 has a substantially symmetrical appearance in the front-rear direction, as shown in FIG. 1 and FIG. 2. The vehicle 10 has no hood and no trunk, and has a substantially box-like (rectangular) external shape having a front end surface and a rear end surface that are substantially vertically upright. A pair of front wheels 25 are provided near the front end of the vehicle 10, and a pair of rear wheels 27 are provided near the rear end thereof.

With reference to FIG. 1, side glasses 14 as window glasses are provided on the left side surface of the vehicle 10. In addition, the entrance doors 12 are provided at the center of the left side surface of the vehicle 10. Note that the vehicle 10 is a vehicle for left-hand traffic.

The entrance doors 12 are double-sided sliding doors that slide to open and close in the front-rear direction of the vehicle, for example. The entrance doors 12 are mostly made of glass. As described above, most of the side surfaces of the vehicle 10 are covered with glass, and the remaining parts of the vehicle 10 are provided with side outer panels 20 that are outer skin panels.

With reference to FIG. 1, a windshield 18 is provided on the front end surface of the vehicle 10. A front outer panel 29 as an outer skin panel is provided below the windshield 18. The front outer panel 29 is provided with a pair of headlamps 23 (headlights).

With reference to FIG. 2, a rear glass 16 is provided on an upper part of the rear surface of the vehicle 10, and a rear outer panel 22 that is an outer skin panel is provided below the rear glass 16. The rear outer panel 22 is provided with a pair of tail lamps 24 (backlights) and a switch box 40 that is a part of the vehicle start-up mechanism according to the present embodiment. For example, openings are formed in the rear outer panel 22, and the tail lamps 24 and the switch box 40 are fitted into these openings. The switch box 40 is provided within a range of 50 cm or more and 2 m or less from the ground such that a person can access this switch box 40, for example. Details of the switch box 40 will be described later.

FIG. 3 exemplifies a perspective view of the inside of the vehicle cabin of the vehicle 10 as viewed from the vehicle center toward the vehicle front side. In the front part of the vehicle cabin, a meter panel 26 is provided at the lower left end of the windshield 18. On the meter panel 26, a vehicle speed, a cruising route, and others are displayed. An operation panel 28 is provided at a front left position of the vehicle cabin. Instructions from a driver can be input into the operation panel 28. For example, when any one of the autonomous driving levels from level 0 to level 4 is set to the vehicle, a driver gets on and drives the vehicle 10.

Further, even in the case in which the autonomous driving level is set to level 5 which does not normally require a driver, the driver may be waiting in the vehicle such that monitoring of the vehicle cabin and or switching of the driving level of level 0 to level 4 can be performed.

A vehicle internal power switch 32 (second vehicle start-up switch) is provided in an operation space in the vehicle cabin, that is, in the vicinity of the operation panel 28 and the meter panel 26. For example, the vehicle internal power switch 32 is provided on an operation console on which the operation panel 28 is installed.

Figure 4:
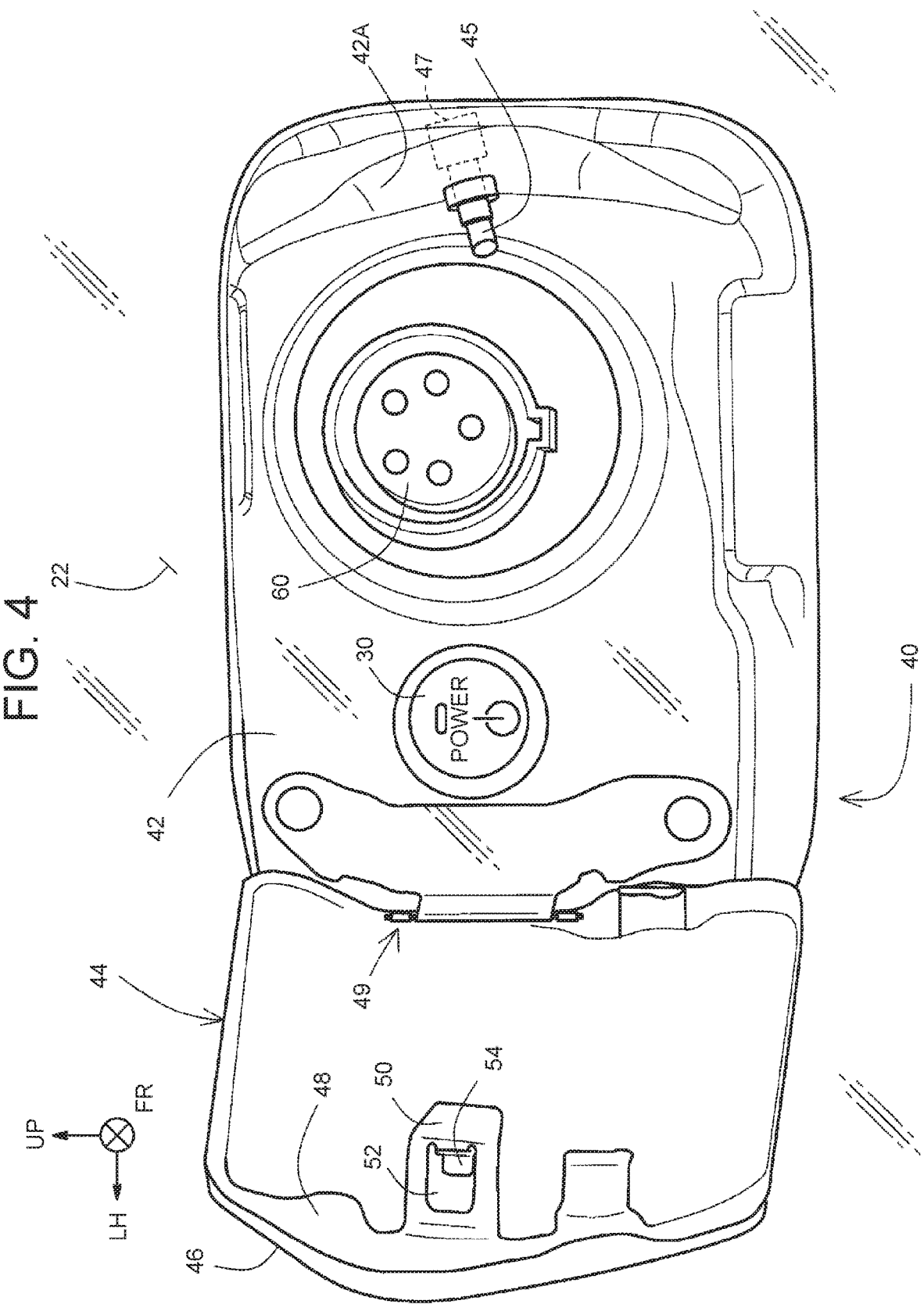
FIG. 4 is a perspective view exemplifying an internal configuration of a switch box when the switch box also functions as a charging port.

The vehicle internal power switch 32 (second vehicle start-up switch) is switchable between a state in which the vehicle 10 can travel (start-up state) and a state in which the vehicle 10 cannot travel (halt state), similarly to a vehicle external power switch 30 exemplified in FIG. 4.

In the case in which the driving source of the vehicle 10 is an engine (internal combustion engine), for example, as either the vehicle external power switch 30 or the vehicle internal power switch 32 is pushed during the halt state in which the vehicle cannot travel, the internal combustion engine in the halt state is started up (initially exploded), and then the vehicle comes into a state of being able to travel.

Further, in a so-called hybrid vehicle or electric vehicle equipped with a rotating electric machine as a driving source of the vehicle 10, by pushing either the vehicle external power switch 30 or the vehicle internal power switch 32 while the vehicle is halted, a high-voltage wiring connecting the main battery 21 (see FIG. 2) to the rotating electric machine is switched from a cutoff state to a connection state.

For example, when the vehicle 10 is in a state of being able to travel, that is, in the start-up state, characters "READY" are displayed on the operation panel 28. When either the vehicle external power switch 30 or the vehicle internal power switch 32 is pushed in this state, characters "READY" disappear from the operation panel 28 and the vehicle 10 comes into a state of being disabled to travel, that is, into the halt state.

Since the vehicle is equipped with physical switches such as the vehicle external power switch 30 and the vehicle internal power switch 32, the vehicle can be reliably started up, for example, in light of a situation that the latter switch is affected by communication environments and the like, as compared with a case in which the vehicle is remotely started up by a remote controller or the like. In addition, for example, by limiting a trigger for starting up the vehicle to only two: the vehicle external power switch 30 and the vehicle internal power switch 32, switching between start-up and halt of the vehicle caused by an erroneous operation can be reduced, as compared with a case in which the vehicle 10 can be started up by a large number of remote controllers.

Figure 6:
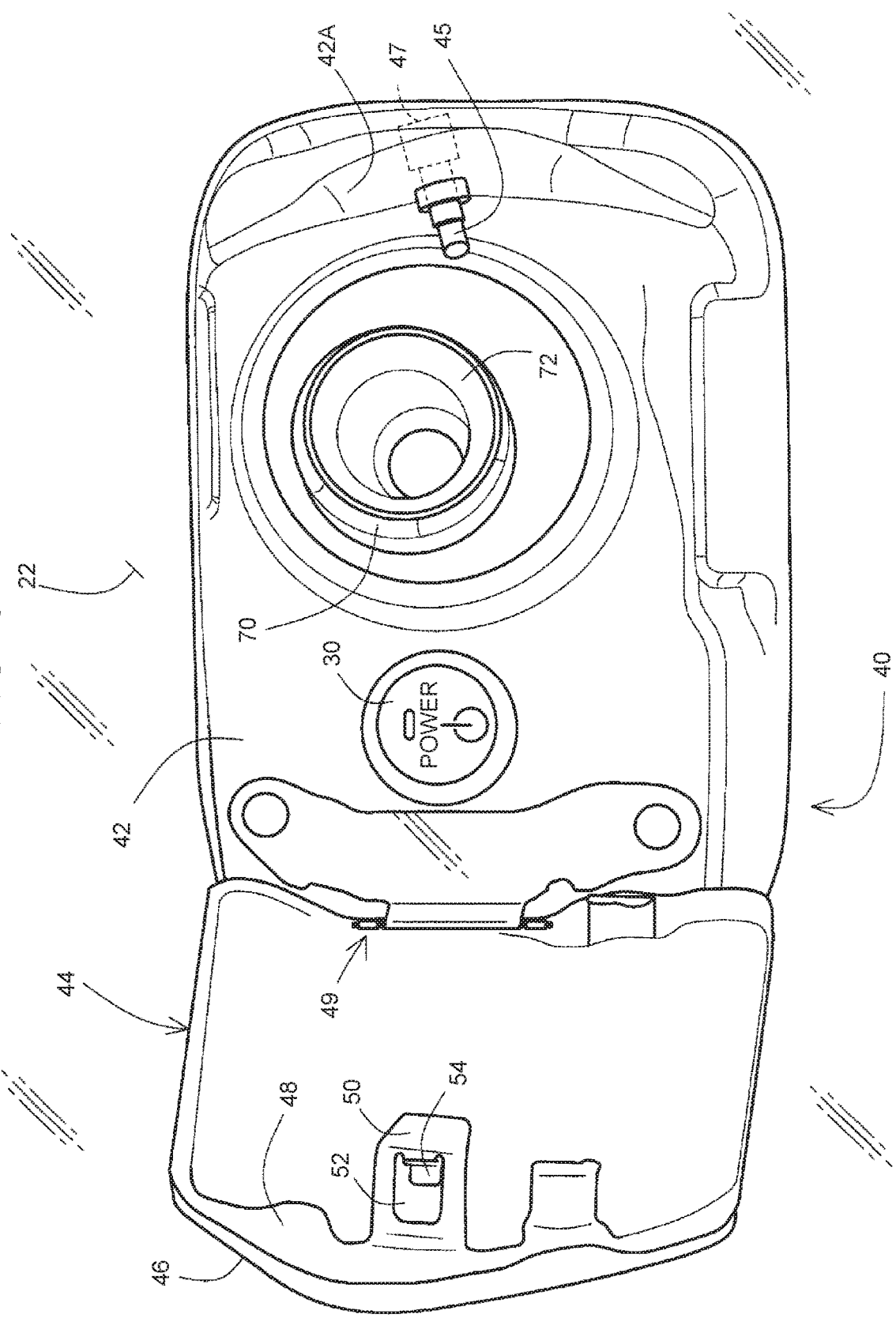
FIG. 6 is a perspective view exemplifying an internal configuration of a switch box when the switch box also functions as a fuel supply port unit.

In FIG. 4 and FIG. 6, the vehicle external power switch 30 is configured as a so-called push-type switch, but the present disclosure is not limited to this mode. For example, as exemplified in FIG. 8, the vehicle external power switch 30 may be a key cylinder-type switch. For example, the vehicle external power switch 30 is provided with a keyhole 31 into which a mechanical key is inserted. As the mechanical key conforming to the shape of the keyhole 31 is inserted into the keyhole 31, the keyhole 31 and a cylinder mechanism provided with this keyhole 31 can be turned. By turning the cylinder mechanism, the cylinder mechanism can be turned between an off position and an on position. For example, by twisting the mechanical key so as to turn the cylinder mechanism from the off position to the on position, the vehicle 10 is started up from the state of being disabled to travel (halt state) to the state of being able to travel (start-up state).

As described above, since the vehicle external power switch 30 is configured as a key cylinder-type switch, the mechanical key is required for starting up the vehicle; therefore, the start-up and the halt of the vehicle by the vehicle external power switch 30 is restricted from being operated by an unauthorized person other than an administrator and an operator in charge (responsible person).

Configuration of Vehicle Start-Up Mechanism

With reference to FIG. 4, the vehicle start-up mechanism according to the present embodiment will be described. The vehicle start-up mechanism includes the switch box 40. The switch box 40 is provided with the vehicle external power switch 30 (first vehicle start-up switch).

With reference to FIG. 2, the switch box 40 is attached to the rear outer panel 22 configuring the outer skin surface of the vehicle. Alternatively, the switch box 40 may be attached to the side outer panel 20. As the switch box 40 is provided on the rear surface or the side surface of the vehicle, that is, provided on a part avoiding the traveling direction of the vehicle, safety for an operator who operates the vehicle external power switch 30 is attained.

In particular, in the case in which the switch box 40 is provided on the left side surface of the vehicle (see FIG. 1), the switch box 40 may be disposed at a position avoiding an open-close area of the entrance doors 12 such that the vehicle external power switch 30 can be operated without being affected by open and close of the entrance doors 12. The open-close area of the entrance doors 12 includes an area occupied when the entrance doors 12 are opened, an area occupied when the entrance doors 12 are closed, and an area occupied when the entrance doors 12 transits between the opened state and the closed state.

Returning to FIG. 4, the switch box 40 includes a lid box 42 that is a tray member recessed inward in the vehicle width direction, and a lid 44 that is a lid member. The lid box 42 and the lid 44 are formed of, for example, the same material as that of the rear outer panel 22, and are formed of an aluminum alloy, for example.

The lid 44 is attached to the lid box 42 via a hinge mechanism 49. The lid 44 is turnable around a rotation shaft of the hinge mechanism 49. Specifically, the lid 44 is configured to be turnable between an opened state in which the vehicle external power switch 30 is exposed to the outside (the state in FIG. 4) and a closed state in which the vehicle external power switch 30 is covered (shielded) from the outside (the state in FIG. 2). The hinge mechanism 49 includes urging member such as a spring (not shown), and the lid 44 is urged in the opening direction. In the closed state, the lid 44 is engaged with a lock pin 45 described later; and in the engagement, movement of the lid 44 in the opening direction is restricted. As the vehicle external power switch 30 is covered with the lid 44, the vehicle external power switch 30 is prevented from being exposed to rain and snow.

The lid 44 includes a lid outer 46 as an outer member and a lid inner 48 as an inner member. A part of the lid inner 48 is uprightly bent with respect to the lid outer 46 and formed into a locking portion 50. The locking portion 50 includes a locking hole 52 into which the lock pin 45 is inserted, and a stopper 54 that receives the front end of the lock pin 45. As the lid 44 is closed so as to cover the lid box 42 and the lock pin 45 is inserted into the locking hole 52 of the locking portion 50, the switch box 40 comes into a locked state.

In this manner, the lid 44 is closed and locked, to thereby prohibit access to the vehicle external power switch 30 from the outside. Thereby, access to the vehicle external power switch 30 by an unauthorized person other than an administrator and an operator in charge (responsible person) is restricted.

A lock pin 45 and a lock mechanism 47 are provided, as a locking-unlocking unit for the lid 44 as the lid member. The lock pin 45 is provided on a side surface 42A of the lid box 42 at a position opposite to the hinge mechanism 49. The lock pin 45 is configured to be movable forward and backward along its longitudinal direction, and is urged in an extended state by an urging member such as a spring. The lock pin 45 is connected to the lock mechanism 47. When the lock mechanism 47 is activated, the lock pin 45 is retracted from the extended state to a retracted state against the urging member. As a result, the lock pin 45 comes out of the locking hole 52 to be in an unlocked state, and the lid 44 is thus opened.

In the mode shown in FIG. 4, the switch box 40 also functions as a charging port. That is, the switch box 40 is provided with a charging inlet 60 together with the vehicle external power switch 30. The charging inlet 60 can be connected to an external charging connector (not shown).

For example, in this mode, a plurality of openings is formed in the plate surface of the lid box 42, and the vehicle external power switch 30 and the charging inlet 60 are fitted into corresponding openings. In addition, for clarifying the illustration, an inlet cover attached to the charging inlet 60 is not shown in FIG. 4.

Since the charging inlet 60 and the vehicle external power switch 30 (first vehicle start-up switch) are housed in a single box, the number of components of the vehicle can be reduced as compared with a case in which boxes are separately provided.

Although FIG. 4 exemplifies the single charging inlet 60, the present disclosure is not limited to this mode. For example, the lid box 42 may be provided with two types of charging inlets 60, which are a charging inlet for quick charging and a charging inlet for normal charging. In this case, the switch box 40 is provided with the vehicle external power switch 30 in addition to these two types of charging inlets 60.

Figure 5:
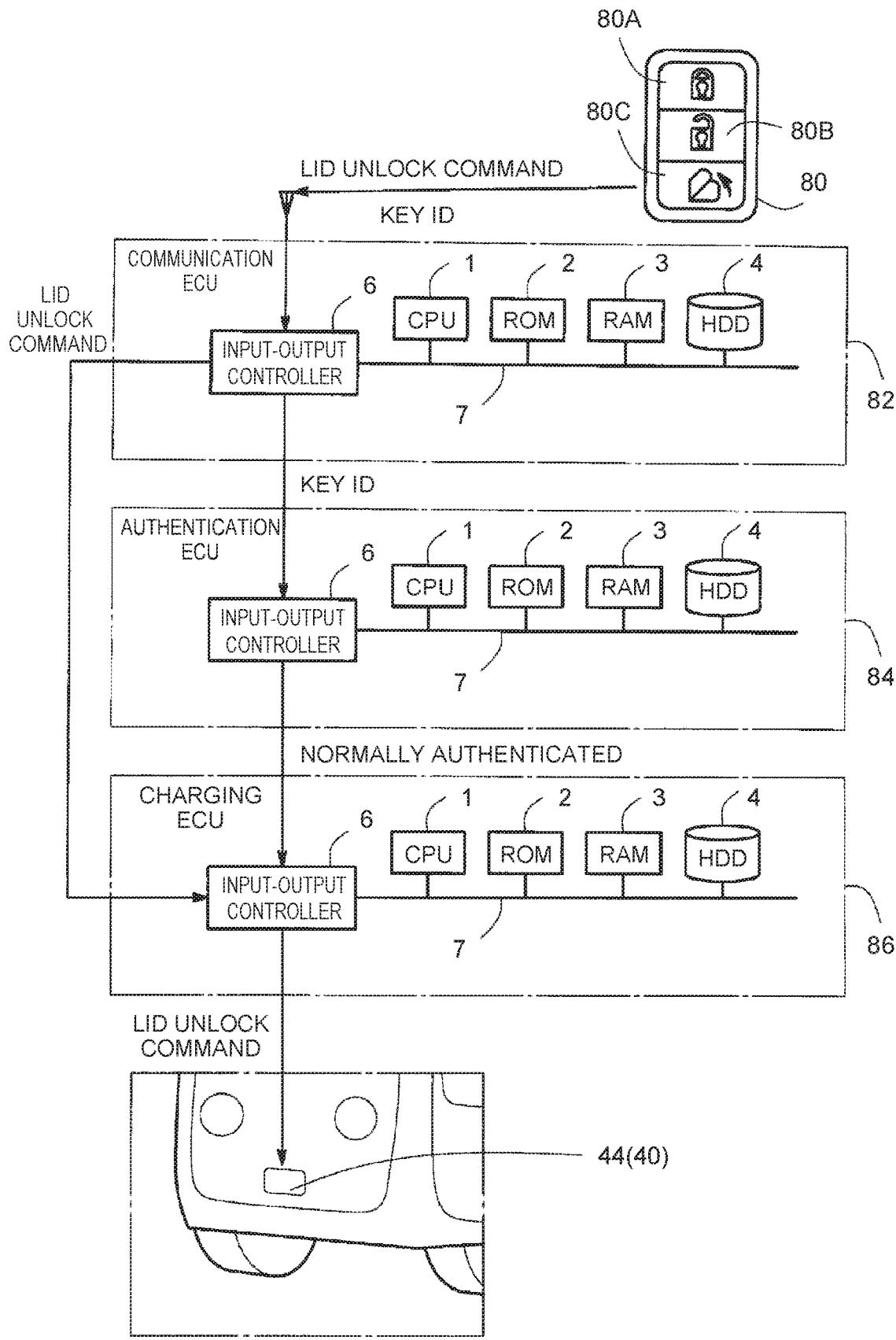
FIG. 5 is a block diagram showing a configuration of a vehicle start-up mechanism, particularly, an unlocking system of the lid according to the present embodiment.

FIG. 5 exemplifies an unlocking system of the lid 44. In this example, the lid 44 is unlocked by using a smart key 80 owned by a person authorized to drive the vehicle 10, such as a driver, an operator in charge, and an administrator. This unlocking system includes the smart key 80, a communication ECU 82, an authentication ECU 84, a charging ECU 86, and the switch box 40.

The smart key 80 is a device to enable the entrance doors 12 and the lid 44 to be unlocked and locked remotely (without direct touching them). The smart key 80 is provided with a door lock switch 80A and a door unlock switch 80B for the entrance doors 12. The smart key 80 is further provided with an unlock switch 80C for the lid 44 of the switch box 40. When these switches are pushed, the smart key 80 transmits radio waves. For example, when any one of these switches is pushed, the smart key 80 transmits electric waves including an operation command (such as a lid unlock command) corresponding to the switch thus pushed and an identification signal (key ID) of the smart key 80.

The communication ECU 82, the authentication ECU 84, and the charging ECU 86 are all electronic control units of the vehicle 10, and are installed in the vehicle 10. Each of these ECUs includes, for example, a computer. With reference to FIG. 5, each of the communication ECU 82, the authentication ECU 84, and the charging ECU 86 includes a CPU 1, a ROM 2, a RAM 3, and a hard disk drive (HDD) 4, which are connected to an internal bus 7. Each of these ECUs also includes an input-output controller 6 for controlling transmission and reception of signals to and from external devices, and this input-output controller 6 is also connected to the internal bus 7.

The communication ECU 82 has a function of distributing received signals to the other ECUs. The authentication ECU 84 determines whether or not the key ID received by the communication ECU 82 is an identification symbol to which the management authority for the vehicle 10 is given.

The charging ECU 86 has a function of managing external charging of the vehicle 10. In addition, the charging ECU 86 can output to the lock mechanism 47 an unlock command to release the engagement between the lid 44 and the lock pin 45 of the switch box 40 (see FIG. 4) that also functions as the charging port.

When the unlock switch 80C of the smart key 80 is pushed, a key ID and a lid unlock command are transmitted from the smart key 80. The transmitted signals are received by the communication ECU 82. The communication ECU 82 transmits the lid unlock command to the charging ECU 86. The communication ECU 82 also transmits the key ID to the authentication ECU 84.

The authentication ECU 84 authenticates the key ID. For example, a key ID to which the management authority for the vehicle 10 is given is stored on the HDD 4 of the authentication ECU 84. The authentication ECU 84 compares the received key ID with the stored key ID, and determines whether or not to the received key ID, the management authority is given.

When confirming that to the received key ID, the management authority is given, the authentication ECU 84 transmits an authentication completion signal to the charging ECU 86. The charging ECU 86 activates the lock mechanism 47 (see FIG. 4) in response to the authentication completion signal and the lid unlock command. Thereby, the lock pin 45 of the switch box 40 is displaced from the extended state to the retracted state, and thus the lock pin 45 comes off from the locking hole 52. Thereby, the lid 44 is opened, so that the vehicle external power switch 30 becomes accessible from the outside.

As described above, since the power switch is provided outside the vehicle, for example, when the autonomous driving level of the vehicle 10 is set to level 5 at which the vehicle can be operated even with the driver absent, it becomes unnecessary for an operator in charge or an administrator to get in the vehicle cabin to carry out the switching control between the start-up and the halt of the vehicle 10.

The vehicle external power switch 30 may be prohibited from being operated while the vehicle 10 is traveling. For example, the charging ECU 86 does not activate the lock mechanism 47 while the vehicle is traveling in spite of receiving an authentication completion signal and a lid unlock command. For example, it may be configured that the charging ECU 86 is connected to a vehicle speed sensor (not shown), and the charging ECU 86 does not activate the lock mechanism 47 when the vehicle speed is a predetermined speed or higher (for example, 15 km/h or higher).

Further, assuming that the power source of the smart key 80 is exhausted, the lid 44 may be provided with a keyhole used for releasing the engagement with the lock pin 45. For example, by inserting the mechanical key into the keyhole and turning this key, the lock pin 45 is retracted and the lid 44 is opened.

As described above, in the present embodiment, since the vehicle external power switch 30 accessible from the outer skin surface of the vehicle is provided, it is unnecessary for a driver to get in the vehicle cabin and operate the power switch when performing the autonomous driving in which a driver is not required.

Further, since the vehicle external power switch 30 is closed by the lid 44 and is also locked by the lid 44 and the lock pin 45, the vehicle external power switch 30 is restricted from being accessed by an unauthorized person.

In the above-described embodiment, the unlocking operation of the lid 44 is performed by using the smart key 80, but the present disclosure is not limited to this mode. For example, the unlocking operation of the lid 44 may be performed by using a mobile terminal such as a smartphone owned by an operator in charge or an administrator. For example, icons with the same functions as those of the door lock switch 80A, the door unlock switch 80B, and the unlock switch 80C of the smart key 80 are displayed on a display screen of the mobile terminal. Then, for example, when the icon of the unlock switch 80C is tapped, a key ID and a lid unlock command thereof are transmitted from the mobile terminal, and are received by the communication ECU 82.

Another Example of Vehicle Start-up Mechanism of Present Embodiment

FIG. 6 exemplifies another embodiment different from FIG. 4. The difference from FIG. 4 is that, in FIG. 6, the switch box 40 also functions as a refueling unit. Specifically, the switch box 40 is provided with a fuel inlet pipe 70 into which an external refueling nozzle can be inserted, instead of the charging inlet 60. The other components are the same as those in FIG. 4, and thus description thereof will be appropriately omitted below.

Figure 7:
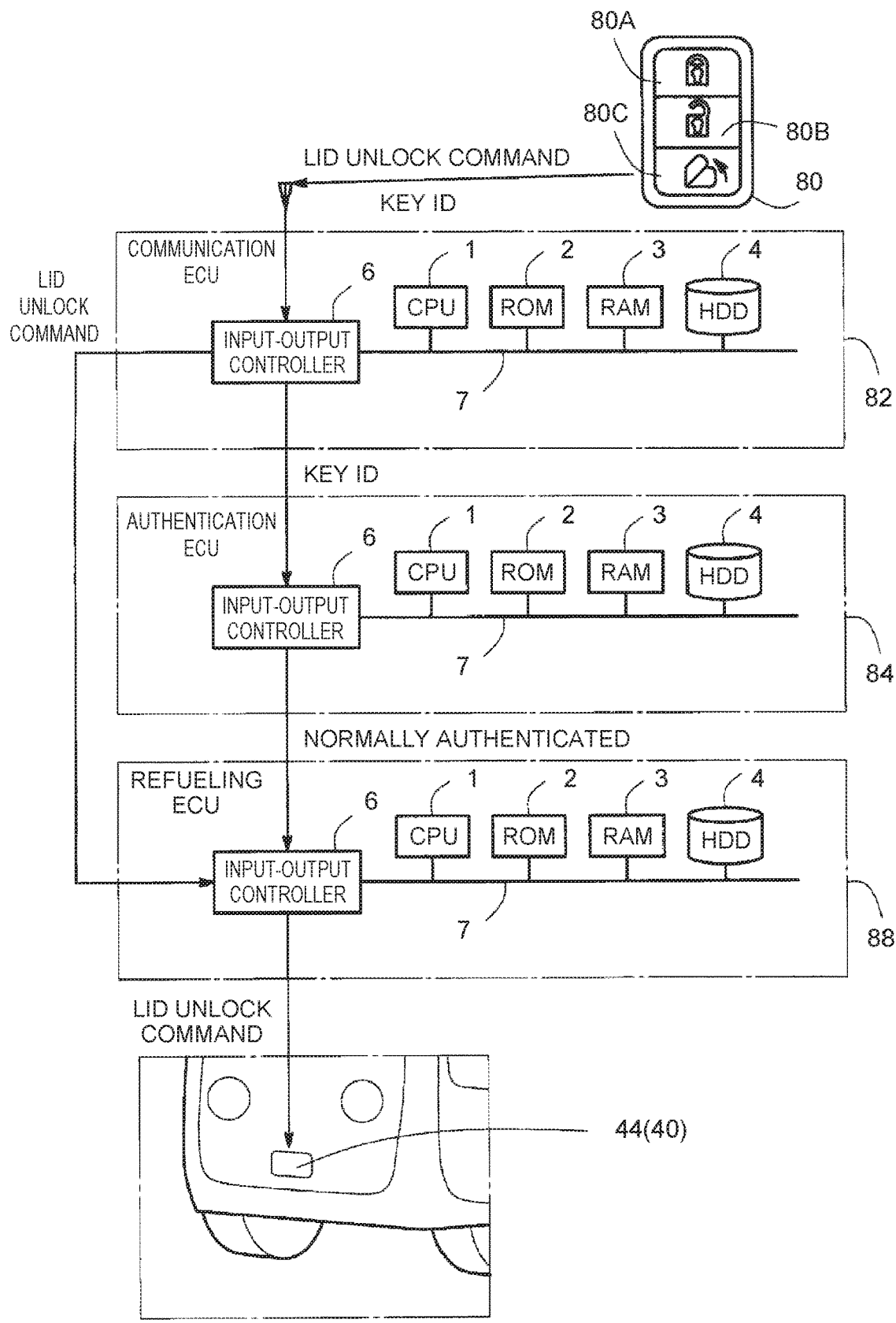
FIG. 7 is a block diagram showing the configuration of the lid unlocking system when the switch box also functions as the fuel supply port unit.
Figure 8:
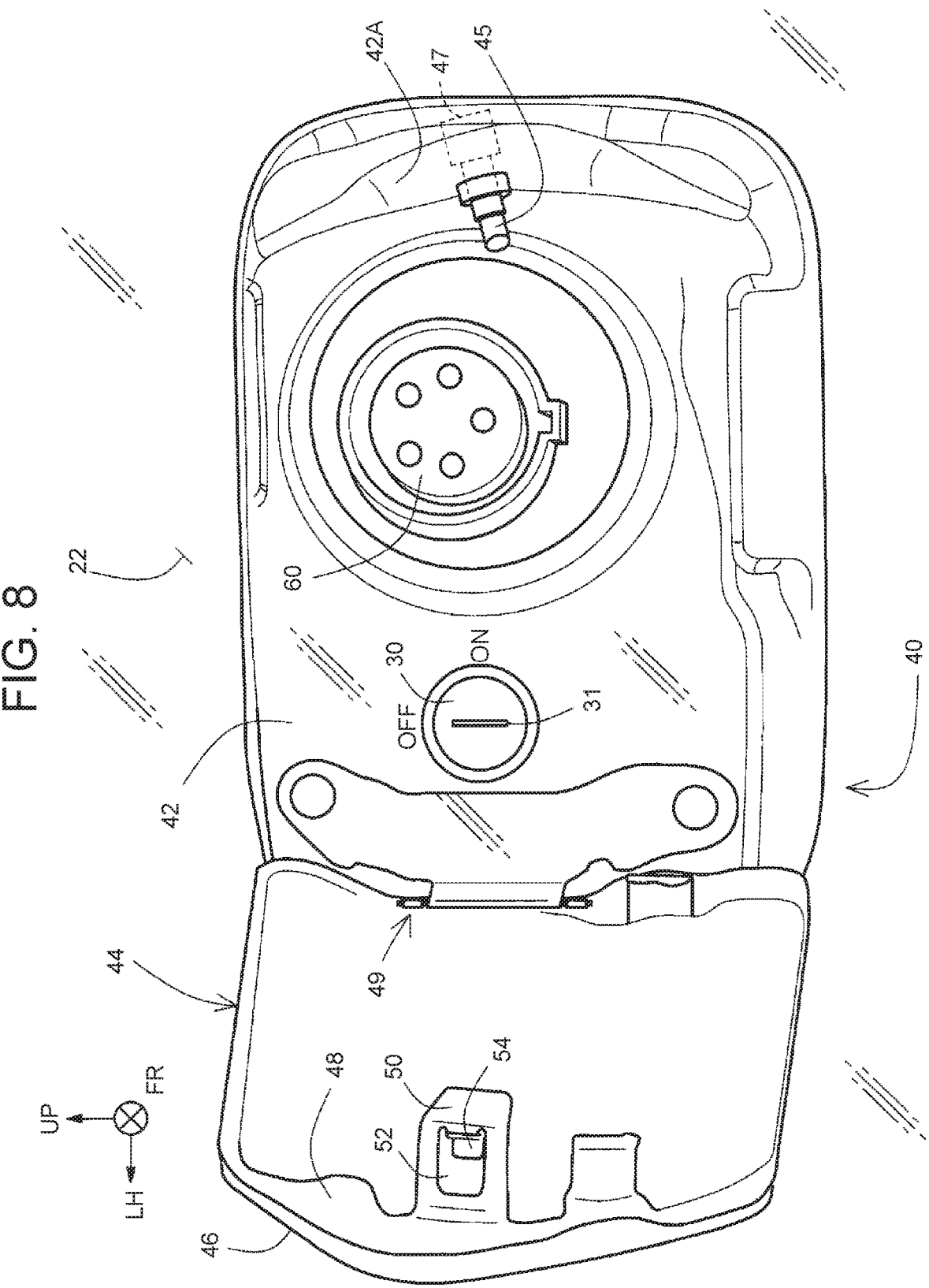
FIG. 8 is a perspective view showing another example of the vehicle external switch.

FIG. 7 exemplifies an embodiment different from that of FIG. 5. The difference from FIG. 5 is that, in FIG. 7, a refueling ECU 88 is provided instead of the charging ECU 86. The other components are the same as those in FIG. 5, and thus description thereof will be appropriately omitted.

In the examples of FIG. 6 and FIG. 7, the vehicle 10 may be an engine vehicle equipped with an engine (internal combustion engine) as a prime mover.

With reference to FIG. 6, the switch box 40 is provided with a fuel supply port 72 of the fuel inlet pipe 70 together with the vehicle external power switch 30. Specifically, the fuel inlet pipe 70 is attached to the lid box 42 of the switch box 40. For example, the fuel inlet pipe 70 is fitted into an opening formed in the lid box 42. When the lid 44 is in the opened state, the fuel supply port 72, which is an end of the fuel inlet pipe 70, is accessible from the outside. In FIG. 6, illustration of a fuel cap is omitted for clarifying the illustration.

With reference to FIG. 7, the refueling ECU 88 is an electronic control unit of the vehicle 10 and is installed in the vehicle 10. As with the other ECUs, the refueling ECU 88 includes a computer, for example, and includes a CPU 1, a ROM 2, a RAM 3, a hard disk drive (HDD) 4, and an input-output controller 6, which are connected to the internal bus 7.

When the unlock switch 80C is pushed from the smart key 80 (or a mobile terminal owned by an operator in charge or an administrator), a lid unlock command is transmitted to the refueling ECU 88 via the communication ECU 82. An authentication completion signal is transmitted to the refueling ECU 88 from the authentication ECU 84.

In response to the authentication completion signal and the lid unlock command, the refueling ECU 88 activates the lock mechanism 47 (see FIG. 6). Thereby, the lock pin 45 of the switch box 40 is displaced from the extended state to the retracted state, and the lock pin 45 thus comes off from the locking hole 52. Thereby, the lid 44 comes into an opened state, so that the vehicle external power switch 30 becomes accessible from the outside.

Further Another Example of Vehicle Start-Up Mechanism of Present Embodiment

In the above-described embodiment, the switching between the start-up and the halt of the vehicle can be carried out by pushing either the vehicle external power switch 30 or the vehicle internal power switch 32; however, the present disclosure is not limited to this mode. For example, as described below, by pushing both the vehicle external power switch 30 and vehicle internal power switch 32, the switching between the start-up and the halt of the vehicle 10 may be carried out.

For example, when the autonomous driving level of the vehicle 10 is set to level 0 to level 4, a partial autonomous driving that requires a driver is executed. In this case, the driver needs to get in the vehicle cabin. Further, in a shared vehicle 10, there is a risk that the vehicle internal power switch 32 may be operated by an unauthorized person other than an administrator or an operation in charge (responsible person) for the purpose of mischief or the like.

When such a function that requires a driver to get in the vehicle is selected, it may be controlled to request the driver to execute the start-up and halting operation and also to prohibit the switching between the start-up and the halt of the vehicle 10 unless both the vehicle external power switch 30 and the vehicle internal power switch 32 are pushed, for the purpose of preventing the start-up and the halt of the vehicle 10 by an unauthorized person.

Figure 9:
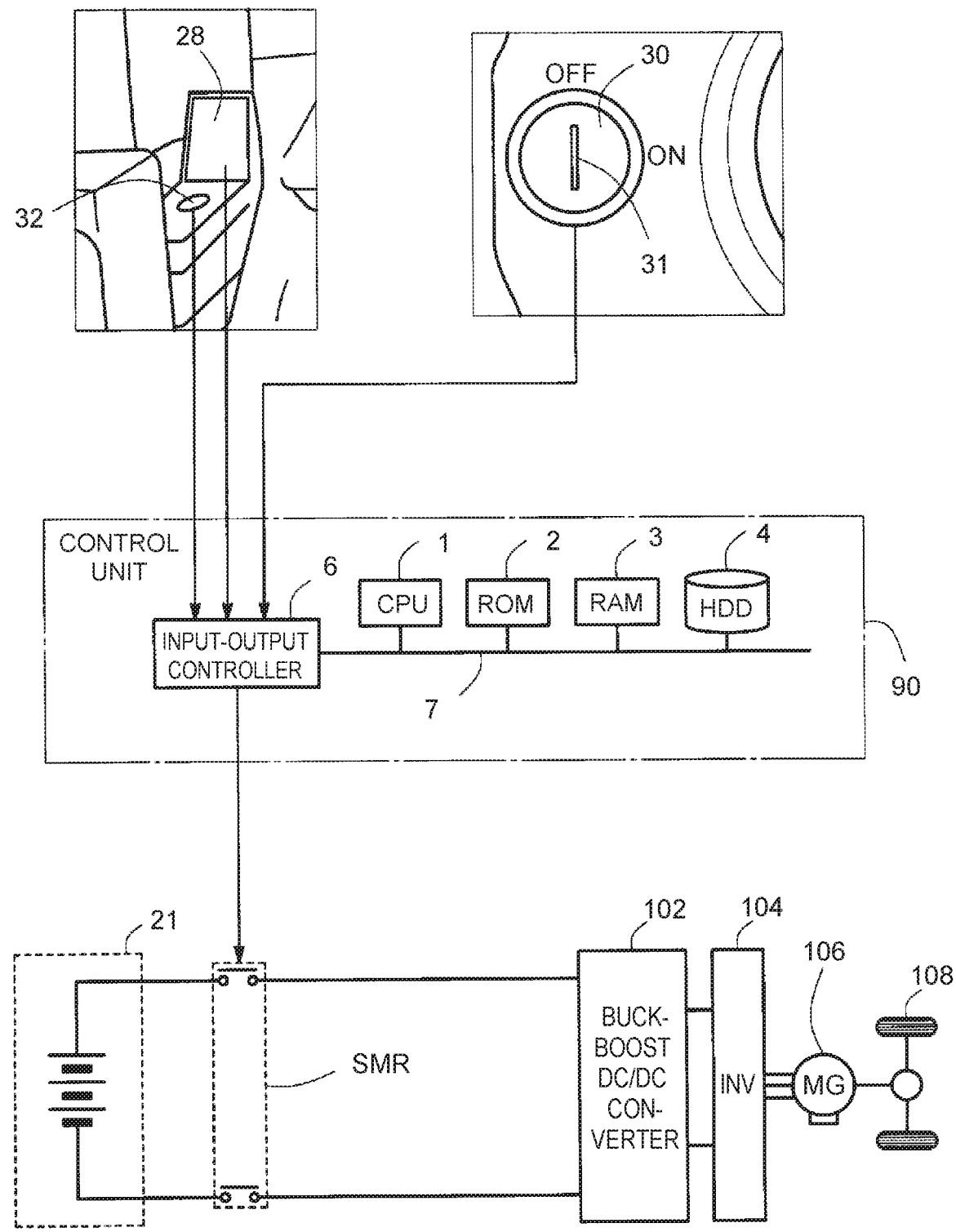
FIG. 9 is a block diagram exemplifying a start-up and halt control system of the vehicle including a vehicle internal switch, a vehicle external switch, a control unit, and a rotating electric machine.

With reference to FIG. 9, the vehicle 10 is provided with a control unit 90. The control unit 90 receives on-off signals of the vehicle external power switch 30 and the vehicle internal power switch 32, and can control the start-up of the vehicle (switching from the state of being disabled to travel to the state of being able to travel) and the halt of the vehicle (switching from the state of being able to travel to the state of being disabled to travel).

For example, FIG. 9 exemplifies a block diagram around the control unit 90 in the case in which the vehicle 10 is an electric vehicle equipped with a rotating electric machine as a driving source. The control unit 90 includes a computer configured by a CPU 1, a ROM 2, a RAM 3, a hard disk drive (HDD) 4, and a circuit board such as an input-output controller 6 that are all connected to an internal bus 7, as with the communication ECU 82, the authentication ECU 84, and the charging ECU 86 in FIG. 5.

The control unit 90 is provided with a switch operation setting unit for execution of the switching between the start-up state and the halt state of the vehicle. For example, a part of the storage area of the hard disk drive 4 is allocated to the switch operation setting unit. This switch operation setting unit stores the setting of the switching operation regarding whether or not the switching control is executed by turning on one of the vehicle external power switch 30 and the vehicle internal power switch 32, or regarding whether or not both the vehicle external power switch 30 and the vehicle internal power switch 32 are required to be turned on for executing the above switching control.

For example, the switch operation setting is defined through the operating the operation panel 28. For example, when any one of level 0 to level 4 is selected as the autonomous driving level of the vehicle 10, for executing the switching control between the start-up and the halt of the vehicle, the switch operation setting is set to the setting (setting 2) that requires both the vehicle external power switch 30 and the vehicle internal power switch 32 to be turned on. When level 5 is selected as the autonomous driving level of the vehicle 10, for executing the switching control between the start-up and the halt of the vehicle, the switch operation setting is set to the setting (setting 1) that requires only one of the vehicle external power switch 30 and the vehicle internal power switch 32 to be turned on.

Alternatively, the switch operation setting may be defined regardless of the level of the autonomous driving. For example, even at level 5 that does not require a driver, during a test driving of the vehicle 10, for example, there may be a case in which the driver is required to get in the vehicle. In such a case, regardless of the level of the autonomous driving, for executing the switching control between the start-up and the halt of the vehicle, the switching operation is set to the setting (setting 2) that requires both the vehicle external power switch 30 and the vehicle internal power switch 32 to be turned on.

As the setting 2, for executing the switching control between the start-up and the halt of the vehicle, the switch operation setting is set to the setting that requires both the vehicle external power switch 30 and the vehicle internal power switch 32 to be turned on. At this time, an unlock command to release the engagement between the lid 44 (see FIG. 8) and the lock pin 45 is output to the lock mechanism 47 by an authorized person such as a driver, an administrator, or an operator in charge (responsible person), as described above. When the lid 44 is opened, the authorized person inserts the mechanical key carried with him or her into the keyhole 31 of the vehicle external power switch 30 and turns this key to the ON position. For example, with the mechanical key inserted into the keyhole 31, this key is twisted 90 degrees clockwise. Thereby, an on signal is transmitted from the vehicle external power switch 30 to the control unit 90. Then, the lid 44 is closed with the mechanical key turned to the ON position.

Further, the authorized person enters the vehicle and pushes the vehicle internal power switch 32. When both the switches are turned on, an on signal is transmitted from the vehicle internal power switch 32 to the control unit 90. In response to this signal, the control unit 90 switches the state of (starts up) the vehicle 10 from the state of being disabled to travel to the state of being able to travel. In accordance with this switching operation, the characters "READY" are displayed on the operation panel 28.

For example, when the state of the vehicle 10 is switched from the state of being disabled to travel to the state of being able to travel, a system main relay SMR connecting the main battery 21 to a rotating electric machine 106 is switched from the cutoff state to the connection state by the control unit 90. Thereby, electric power of the main battery 21 is sent to the rotating electric machine 106 as a driving source via a buck-boost DC/DC converter 102 and an inverter 104. Further, driving force from the rotating electric machine 106 is transmitted to wheels 108 (for example, rear wheels).

In addition, for halting the vehicle by switching the vehicle state from the state of being able to travel to the state of being disabled to travel, the above unauthorized person first pushes the vehicle internal power switch 32. Thereby, an off signal is transmitted from the vehicle internal power switch 32 to the control unit 90.

Further, the authorized person gets out of the vehicle and outputs an unlock command to the lock mechanism 47. When the lid 44 is opened in response to the unlock command, the authorized person turns the mechanical key inserted in the keyhole 31 so as to move the keyhole 31 to the OFF position. At this time, an off signal is transmitted from the vehicle external power switch 30 to the control unit 90.

As described above, as the vehicle internal power switch 32 and the vehicle external power switch 30 are turned off, the control unit 90 switches the state of the vehicle 10 from the state of being able to travel to the state of being disabled to travel. In accordance with this switching operation, the characters "READY" disappear from the operation panel 28, and the vehicle 10 then comes into the state of being disabled to travel, that is, comes into the halt state.

For example, when the state of the vehicle 10 is switched from the state of being able to travel to the state of being disabled to travel, the system main relay SMR that connects the main battery 21 to the rotating electric machine 106 is switched from the connection state to the cutoff state by the control unit 90.

FIG. 10 illustrates a flow of the vehicle start-up control by the control unit 90. With reference to FIG. 9 and FIG. 10, when the vehicle external power switch 30 is turned on, that is, the keyhole 31 is turned to the ON position, for example, the control unit 90 receives an on signal from the vehicle external power switch 30. Further, the control unit 90 refers to the switch operation setting unit (not shown).

Then, the control unit 90 determines whether or not the state currently set in the switch operation setting unit corresponds to the setting that requires only one of the vehicle external power switch 30 and the vehicle internal power switch 32 to be turned on (setting 1) for executing the switching control between the start-up and the halt of the vehicle (S10).

When the setting currently set in the switch operation setting unit is setting 1, the control unit 90 switches the system main relay SMR from the cutoff state to the connection state. Thereby, the state of the vehicle 10 is switched from the state of being disabled to travel to the state of being able to travel (S14).

On the other hand, when the setting currently set in the switch operation setting unit is setting 2, the control unit 90 determines whether or not the vehicle internal power switch 32 is turned on (pushed) after the vehicle external power switch 30 is turned on (S12). When the vehicle internal power switch 32 is not pushed, the control unit 90 suspends the start-up of the vehicle 10.

When the vehicle internal power switch 32 is pushed in step S12, that is, when an on signal is received from the vehicle internal power switch 32, the control unit 90 switches the system main relay SMR from the cutoff state to the connection state. Thereby, the state of the vehicle 10 is switched from the state of being disabled to travel to the state of being able to travel (S14). In other words, the vehicle 10 in the halt state is started up by the control unit 90 into the state of being able to travel.

FIG. 11 illustrates a flow of the vehicle halting control by the control unit 90. With reference to FIG. 9 and FIG. 11, the control unit 90 receives an off signal from the vehicle internal power switch 32 when the vehicle internal power switch 32 is turned off. Further, the control unit 90 refers to the switch operation setting unit (not shown). For executing the switching control between the start-up and the halt of the vehicle, the control unit 90 determines whether or not the setting currently set in the switch operation setting unit is the setting (setting 1) that requires only one of the vehicle external power switch 30 and the vehicle internal power switch 32 to be turned on (S20).

When the setting currently set in the switch operation setting unit is setting 1, the control unit 90 switches the system main relay SMR from the connection state to the cutoff state. Thereby, the state of the vehicle 10 is switched from the state of being able to travel to the state of being disabled to travel (the halt state) (S24).

On the other hand, when the setting currently set in the switch operation setting unit is setting 2, the control unit 90 determines whether or not the vehicle external power switch 30 is turned off after the vehicle internal power switch 32 is turned off (S22). When the vehicle external power switch 30 is not turned off, the control unit 90 suspends the halting of the vehicle 10 and maintains the vehicle 10 in the state of being able to travel.

When the vehicle external power switch 30 is turned off in step S22, the control unit 90 receives an off signal from the vehicle external power switch 30. In response to this signal, the control unit 90 switches the system main relay SMR from the connection state to the cutoff state. Thereby, the state of the vehicle 10 is switched from the state of being able to travel to the state of being disabled to travel (the halt state) (S24).

Another Example of Power Switch

In the above-described embodiment, the vehicle external power switch 30 and the vehicle internal power switch 32 are provided as the power switches for executing the switching between the start-up and the halt of the vehicle 10, but the present disclosure is not limited to this mode. For example, instead of the vehicle internal power switch 32, a mobile terminal such as a remote controller or a smartphone may have a power switch function (second vehicle start-up switch) for executing the switching between the start-up and the halt of the vehicle 10. For example, a command to execute the switching between the start-up and the halt of the vehicle 10 may be transmitted to the vehicle 10 from a base station installed in an area away from the vehicle 10. Alternatively, a command to execute the switching between the start-up and the halt of the vehicle 10 may be transmitted from a smartphone carried with an authorized person such as a driver, an administrator, and an operator in charge (responsible person).

What is claimed is:

1. A vehicle start-up mechanism provided in a vehicle configured to travel while occupants are boarded in a vehicle cabin, the vehicle start-up mechanism comprising:
   a first vehicle start-up switch configured to switch a state of the vehicle between a start-up state and a halt state, the vehicle having an autonomous driving function; and
   a switch box provided on an outer surface of the vehicle and having the first vehicle start-up switch.

2. The vehicle start-up mechanism according to claim 1, further comprising:
   a second vehicle start-up switch configured to switch the state of the vehicle between the start-up state and the halt state; and
   a control unit configured to
      receive an ON signal and an OFF signal from the first vehicle start-up switch and the second vehicle start-up switch, control start-up and halt of the vehicle based on the ON signal or the OFF signal, and set the state of the vehicle to the start-up state from the halt state when the second vehicle start-up switch is turned on after the first vehicle start-up switch is turned on.

3. The vehicle start-up mechanism according to claim 2, wherein the second vehicle start-up switch is provided in the vehicle cabin of the vehicle.

4. The vehicle start-up mechanism according to claim 1, wherein the switch box is provided with a lid member configured to switch the first vehicle start-up switch between a state of being exposed to the outside and a state of being covered from the outside.

5. The vehicle start-up mechanism according to claim 4, wherein the switch box is provided with a lock-unlock unit for the lid member.

6. The vehicle start-up mechanism according to claim 4, wherein:
the switch box also functions as a charging port for external charging; and
a charging inlet configured to be connected to an external charging connector is provided together with the first vehicle start-up switch in the switch box.

7. The vehicle start-up mechanism according to claim 4, wherein:
the switch box also functions as a fuel supply port unit; and
a fuel supply port of a fuel inlet pipe into which an external refueling nozzle is inserted is provided together with the first vehicle start-up switch in the switch box.

8. The vehicle start-up mechanism according to claim 1, wherein the switch box is provided on a rear surface of the vehicle.

9. The vehicle start-up mechanism according to claim 1, wherein the switch box is at a position avoiding an open-close area of an entrance door.

10. The vehicle start-up mechanism according to claim 1, wherein:
the switch box also functions as a charging port for external charging; and
a charging inlet configured to be connected to an external charging connector is provided together with the external power switch in the switch box.

11. A vehicle mechanism provided in a vehicle configured to travel while occupants are boarded in a vehicle cabin, the vehicle mechanism comprising:
a vehicle external power switch configured to change a state of the vehicle between a start-up state in which power is supplied to the vehicle and a halt state in which power is not supplied to the vehicle; and
a box provided on an outer surface of the vehicle and having the vehicle external power switch.

12. The vehicle mechanism according to claim 11, further comprising:
a vehicle internal power switch configured to change the state of the vehicle between the start-up state and the halt state; and
a control unit configured to
receive an ON signal and an OFF signal from the vehicle external power switch and the vehicle internal power switch,
control start-up and halt of the vehicle based on the ON signal or the OFF signal, and
set the state of the vehicle to the start-up state from the halt state when the vehicle internal power switch is turned on after the vehicle external power switch is turned on.

13. The vehicle mechanism according to claim 12, wherein the vehicle internal power switch is provided in the vehicle cabin of the vehicle.

14. The vehicle mechanism according to claim 11, wherein the box is provided with a lid member configured to change the vehicle external power switch between a state of being exposed to the outside and a state of being covered from the outside.

15. The vehicle mechanism according to claim 14, wherein the box is provided with a lock-unlock unit for the lid member.

16. The vehicle mechanism according to claim 14, wherein:
the box also functions as a charging port for external charging; and
a charging inlet configured to be connected to an external charging connector is provided together with the vehicle external power switch in the box.

17. The vehicle mechanism according to claim 14, wherein:
the box also functions as a fuel supply port unit; and
a fuel supply port of a fuel inlet pipe into which an external refueling nozzle is inserted is provided together with the vehicle external power switch in the box.

18. The vehicle mechanism according to claim 11, wherein the box is provided on a rear surface of the vehicle.

19. The vehicle mechanism according to claim 11, wherein the box is at a position avoiding an open-close area of an entrance door.

20. The vehicle mechanism according to claim 11, wherein:
the box also functions as a charging port for external charging; and
a charging inlet configured to be connected to an external charging connector is provided together with the vehicle external power switch in the box.

* * * * *